United States Patent
Nikhara et al.

(10) Patent No.: US 10,735,704 B2
(45) Date of Patent: Aug. 4, 2020

(54) SYSTEMS AND METHODS FOR AUTOMATIC WHITE BALANCE

(71) Applicant: QUALCOMM Incorporated, San Diego, CA (US)

(72) Inventors: Soman Ganesh Nikhara, Hyderabad (IN); Ho Sang Lee, San Diego, CA (US); Kyuseo Han, San Diego, CA (US); Pradeep Veeramalla, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 16/134,087

(22) Filed: Sep. 18, 2018

(65) Prior Publication Data
US 2019/0253682 A1  Aug. 15, 2019

(30) Foreign Application Priority Data
Feb. 9, 2018  (IN) .............................. 201841005011

(51) Int. Cl.
*H04N 9/73* (2006.01)
*H04N 5/235* (2006.01)
*H04N 1/60* (2006.01)

(52) U.S. Cl.
CPC .............. *H04N 9/735* (2013.01); *H04N 1/60* (2013.01); *H04N 1/6077* (2013.01); *H04N 5/2351* (2013.01)

(58) Field of Classification Search
CPC .. H04N 5/235; H04N 58/2351; H04N 5/2352; H04N 5/2353; H04N 5/2354; H04N 9/64; H04N 9/73; H04N 9/735; H04N 5/2351; H04N 1/60; H04N 1/6077
See application file for complete search history.

(56) References Cited

U.S. PATENT DOCUMENTS

| | | | |
|---|---|---|---|
| 9,609,331 B2 * | 3/2017 | Liang | H04N 21/2353 |
| 2004/0155977 A1 * | 8/2004 | Clark, II | H04N 5/2351 348/362 |
| 2008/0278600 A1 | 11/2008 | Cho et al. | |
| 2010/0020193 A1 * | 1/2010 | Zhang | H04N 9/73 348/223.1 |
| 2016/0360176 A1 | 12/2016 | Nikhara et al. | |
| 2017/0180620 A1 | 6/2017 | Takasumi et al. | |
| 2018/0007336 A1 * | 1/2018 | Nikhara | H04N 5/23229 |

OTHER PUBLICATIONS

International Search Report and Written Opinion—PCT/US2019/013188—ISA/EPO—dated Mar. 25, 2019.

* cited by examiner

*Primary Examiner* — Ngoc Yen T Vu
(74) *Attorney, Agent, or Firm* — Paradice and Li LLP

(57) ABSTRACT

Aspects of the present disclosure relate to systems and methods for performing automatic white balance (AWB). An example device may include a memory and a processor coupled to the memory. The processor may be configured to receive a first image of a scene, measure a first illuminant of the first received image, compare the first illuminant and a first illuminant value, determine the scene is changing between the first received image and a previous image based on the comparison, adjust a first AWB convergence rate to a second AWB convergence rate in response to determining the scene is changing, and converge from a first balancing factor to a second balancing factor for one or more white balance operations based on the second AWB convergence rate.

28 Claims, 10 Drawing Sheets

SYSTEMS AND METHODS FOR AUTOMATIC WHITE BALANCE

CROSS-REFERENCE TO RELATED APPLICATIONS

This patent application claims priority to India Foreign Patent Application No. 201841005011 entitled "SYSTEMS AND METHODS FOR AUTOMATIC WHITE BALANCE" filed on Feb. 9, 2018, which is assigned to the assignee hereof. The disclosure of the prior application is considered part of and is incorporated by reference in this patent application.

TECHNICAL FIELD

This disclosure relates generally to systems and methods for image capture devices, and specifically to systems and methods for automatic white balance.

BACKGROUND

The color temperature of light in a scene may add a color cast to a captured image (with the image appearing tinted or having an overall color tone). Additionally, different light sources for a scene may cause different portions of an image to have different color casts. For example, a camera flash may add a blue or cool color cast/overall tone, incandescent lighting may add a yellow or warm color cast/overall tone, and outdoor lighting at different times of day and different cloud cover may add a variety of color casts/overall tones.

Devices (such as digital cameras or other devices configured to capture a digital image) automatically may perform white or color balancing. Automatic white balance (AWB) is a process of estimating a color cast of an image based on portions of the image that should be displayed as neutral colors (such as white or shades of gray). A device may attempt to correct the color tone (remove the color cast) of an image when determined that portions of the image that should be neutral colors are not captured as neutral colors.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

Aspects of the present disclosure relate to systems and methods for performing automatic white balance (AWB). An example device may include a memory and a processor coupled to the memory. The processor may be configured to receive a first image of a scene, measure a first illuminant of the first received image, compare the first illuminant and a first illuminant value, determine the scene is changing between the first received image and a previous image based on the comparison, adjust a first AWB convergence rate to a second AWB convergence rate in response to determining the scene is changing, and converge from a first balancing factor to a second balancing factor for one or more white balance operations based on the second AWB convergence rate. In another example, a method is disclosed. The example method includes receiving a first image of a scene, measuring a first illuminant of the first received image, comparing the first illuminant and a first illuminant value, determining the scene is changing between the first received image and a previous image based on the comparison, adjusting a first AWB convergence rate to a second AWB convergence rate in response to determining the scene is changing, and converging from a first balancing factor to a second balancing factor for one or more white balance operations based on the second AWB convergence rate.

In a further example, a non-transitory computer-readable medium is disclosed. The non-transitory computer-readable medium may store instructions that, when executed by a processor, cause a device to receive a first image of a scene, measure a first illuminant of the first received image, compare the first illuminant and a first illuminant value, determine the scene is changing between the first received image and a previous image based on the comparison, adjust a first AWB convergence rate to a second AWB convergence rate in response to determining the scene is changing, and converge from a first balancing factor to a second balancing factor for one or more white balance operations based on the second AWB convergence rate.

In another example, a device is disclosed. The device includes means for receiving a first image of a scene, means for measuring a first illuminant of the first received image, means for comparing the first illuminant and a first illuminant value, means for determining the scene is changing between the first received image and a previous image based on the comparison, means for adjusting a first AWB convergence rate to a second AWB convergence rate in response to determining the scene is changing, and means for converging from a first balancing factor to a second balancing factor for one or more white balance operations based on the second AWB convergence rate.

BRIEF DESCRIPTION OF THE DRAWINGS

Aspects of the present disclosure are illustrated by way of example, and not by way of limitation, in the figures of the accompanying drawings and in which like reference numerals refer to similar elements.

DETAILED DESCRIPTION

Figure 1:
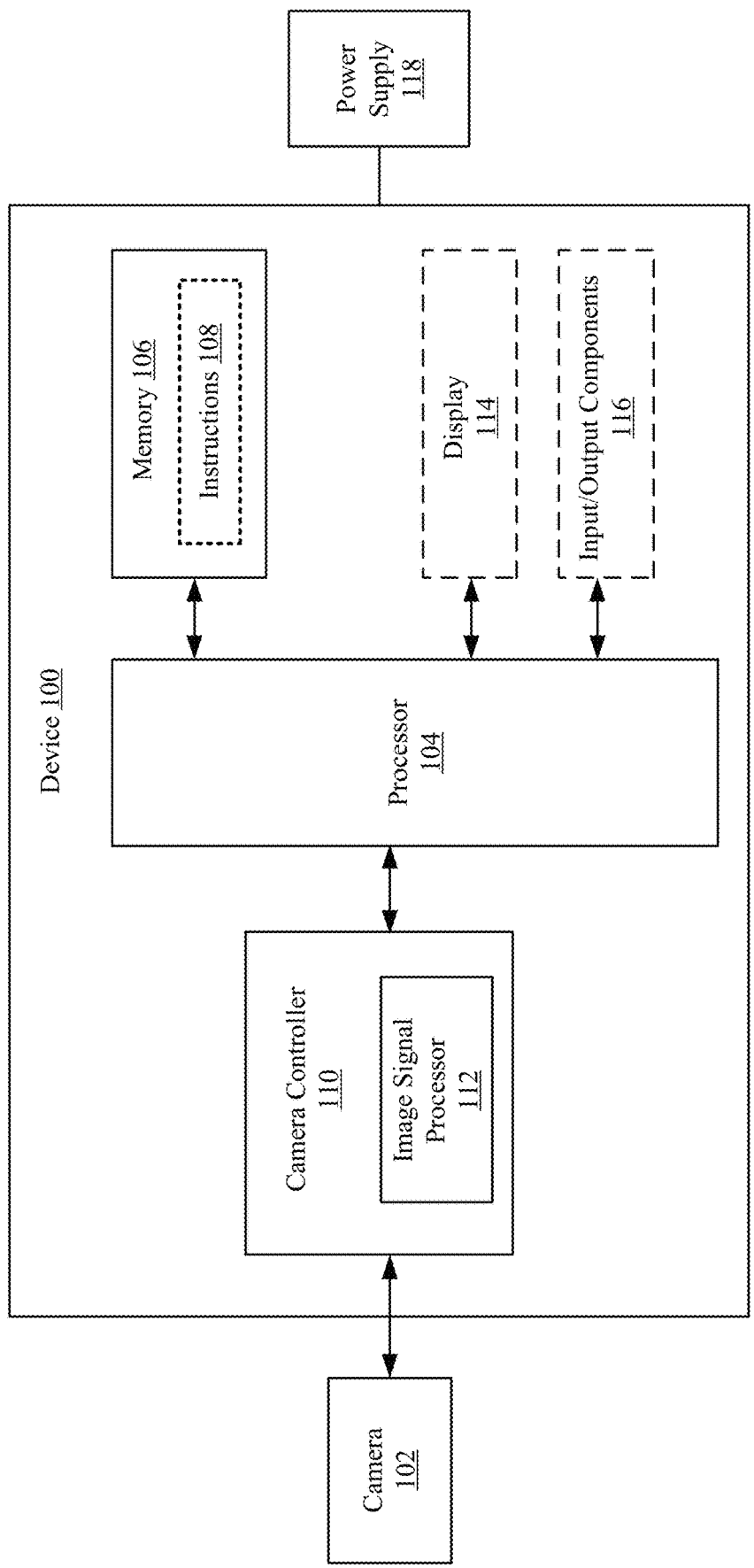
FIG. 1 is a block diagram of an example device for performing AWB.

Aspects of the present disclosure may be used for performing AWB. Devices including or coupled to a camera (such as a smartphone, tablet, video security system, digital camera, or other suitable device) may perform AWB to estimate a color cast of an image and/or determine a correction for the color cast (which may be referred to as a color tone or color temperature of an image). The correction may be used by the device in capturing and processing the image during the image processing pipeline to correct the color tone. When the scene changes for the camera, such as the camera being moved or objects entering the scene, the device may need to repeat performing AWB to estimate a new color cast. For example, when a camera is moved from indoors to outdoors, the change in ambient lighting may cause a different color cast. As a result, AWB may be used to estimate a new color cast, which may be used to determine a new correction to correct the color cast of an image captured with the different ambient light.

A problem with repeating AWB operations is that the operations may cause delays in capturing and processing images requested by a user (such as a user clicking a shutter button or otherwise requesting an image capture). For example, a device may not capture and process an image as requested by the user while the device is performing AWB. As a result, the user must wait for an AWB operation to complete before the device may capture the requested image. Additionally, a device may provide an image preview to the user. The image preview may be a stream of captured images that are not fully processed before being displayed to quickly provide the user an indication of what the camera will capture for a requested image (including an indication of the colors). The image preview may be impacted by the AWB process. For example, the image preview may show fluctuations in flux or color cast as AWB is performed, which may confuse the user or otherwise prevent the user from understanding what colors are to be captured in a requested image. Delaying a requested image capture or causing color fluctuations in an image preview may degrade the user experience.

A device may perform AWB to estimate a color cast and/or to determine one or more balancing factors to be used in correcting the color cast of an image. For example, balancing factors may be for adjusting the red, blue and green (RGB) values for each pixel in a RGB space, may be for adjusting the chrominance values U and V of each pixel in a YUV (Y'UV) space, or may be for adjusting colors in other suitable color spaces. When the scene changes, such as the camera being moved or objects entering the scene, the color temperature of the light illuminating the scene and being sensed by a camera sensor may change. For example, when the camera moves from indoors to outdoors, the color temperature of the light may change from 3,000 Kelvin to 5,000 Kelvin. As a result, new balancing factors may be needed to correct a different color cast as a result of the different color temperature for the lighting.

If the scene change is temporary, such as passing by a window with bright outdoor light shining on the camera sensor and then quickly ceasing, the device may determine new balancing factors when outdoor light (with a different color temperature and intensity) shines on the camera sensor and again when outdoor light ceases to shine on the camera sensor. When outdoor light ceases to shine on the camera sensor, the operations in determining new balancing factors may be performed but produce balancing factors that are the same as the previous balancing factors before passing the window. As a result, the additional operations when passing the window may cause a delay in capturing images even though the scene is similar before and after passing the window.

Further, the previous scene's measurements and the current scene's measurements both may be used in determining balancing factors, with the device recursively converging to new balancing factors. Conventional convergence is at a static rate irrespective of the magnitude of scene change (such as the change in color temperature or intensity of the light). As a result, large scene changes (such as large changes in ambient light caused by moving the camera from indoors to outdoors in bright daylight) may cause longer operations in converging to new balancing factors than smaller scene changes (such as smaller changes in ambient light).

In some aspects of the present disclosure, a device may prevent operations in converging to new balancing factors from being performed for temporary changes in the scene. In some further aspects of the present disclosure, the device may vary the rate of convergence to new balancing factors, or otherwise adjust the convergence process. In this manner, the device may compensate for temporary scene changes (such as passing by a window) and compensate for the magnitude of scene change in converging to new balancing factors for white balance operations.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well-known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory and the like.

Aspects of the present disclosure are applicable to any suitable electronic device having or coupled to a camera for capturing images or video (such as a security system with one or more cameras, smartphones, tablets, laptop computers, digital video and/or still cameras, web cameras, etc.). While described below with respect to a device having or coupled to one camera, aspects of the present disclosure are applicable to devices having any number of cameras (including no cameras, where a separate device is used for capturing images or video which are provided to the device), and are therefore not limited to devices having one camera. Aspects of the present disclosure are applicable for capturing still images as well as for capturing video, and may be implemented in devices having or coupled to cameras of different capabilities (such as a video camera or a still image camera).

The term "device" is not limited to one or a specific number of physical objects (such as one smartphone, one camera controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects.

FIG. 1 is a block diagram of an example device 100 for performing AWB. The example device 100 may include or be coupled to a camera 102, a processor 104, a memory 106 storing instructions 108, and a camera controller 110. The device 100 optionally may include (or be coupled to) a display 114 and a number of input/output (I/O) components 116. The device 100 may include additional features or components not shown. For example, a wireless interface, which may include a number of transceivers and a baseband processor, may be included for a wireless communication device. The device 100 may include or be coupled to additional cameras other than the camera 102. The disclosure should not be limited to any specific examples or illustrations for a device, including the example device 100.

The camera 102 may be capable of capturing individual image frames (such as still images) and/or capturing video (such as a succession of captured image frames). The camera 102 may include a single camera sensor and camera lens, or be a dual camera module or any other suitable module with multiple camera sensors and lenses. The memory 106 may be a non-transient or non-transitory computer readable medium storing computer-executable instructions 108 to perform all or a portion of one or more operations described in this disclosure. The device 100 may also include a power supply 118, which may be coupled to or integrated into the device 100.

The processor 104 may be one or more suitable processors capable of executing scripts or instructions of one or more software programs (such as instructions 108) stored within the memory 106. In some aspects, the processor 104 may be one or more general purpose processors that execute instructions 108 to cause the device 100 to perform any number of functions or operations. In additional or alternative aspects, the processor 104 may include integrated circuits or other hardware to perform functions or operations without the use of software. While shown to be coupled to each other via the processor 104 in the example of FIG. 1, the processor 104, the memory 106, the camera controller 110, the optional display 114, and the optional I/O components 116 may be coupled to one another in various arrangements. For example, the processor 104, the memory 106, the camera controller 110, the optional display 114, and/or the optional I/O components 116 may be coupled to each other via one or more local buses (not shown for simplicity).

The display 114 may be any suitable display or screen allowing for user interaction and/or to present items (such as captured images, video, or a preview image) for viewing by a user. In some aspects, the display 114 may be a touch-sensitive display. The I/O components 116 may be or include any suitable mechanism, interface, or device to receive input (such as commands) from the user and to provide output to the user. For example, the I/O components 116 may include (but are not limited to) a graphical user interface, keyboard, mouse, microphone and speakers, and so on. The display 114 and/or the I/O components 116 may provide a preview image to a user and/or receive a user input for adjusting one or more settings of the camera 102 (such as selecting and/or deselecting a region of interest of a displayed preview image for an AF operation).

The camera controller 110 may include an image signal processor 112, which may be one or more image signal processors to process captured image frames or video provided by the camera 102. In some example implementations, the camera controller 110 (such as the image signal processor 112) may determine when to perform and perform AWB for images captured by the camera 102. In some aspects, the image signal processor 112 may execute instructions from a memory (such as instructions 108 from the memory 106 or instructions stored in a separate memory coupled to the image signal processor 112) to process image frames or video captured by the camera 102. In other aspects, the image signal processor 112 may include specific hardware to process image frames or video captured by the camera 102. The image signal processor 112 may alternatively or additionally include a combination of specific hardware and the ability to execute software instructions.

One or more different scene characteristics may be measured, identified, or estimated in determining when to perform AWB and/or when determining balancing factors. The different scene characteristics may correspond to the scene lighting and may be called "illuminants." Example illuminants include, but are not limited to, RGB gains and gain changes in the RGB space, chrominance changes in the YUV space, green-magenta shifts, correlated color temperatures (CCTs), and changes in exposure or luminance. One or more illuminants may be used for determining when to perform AWB or for correcting the color cast of an image.

Figure 2:
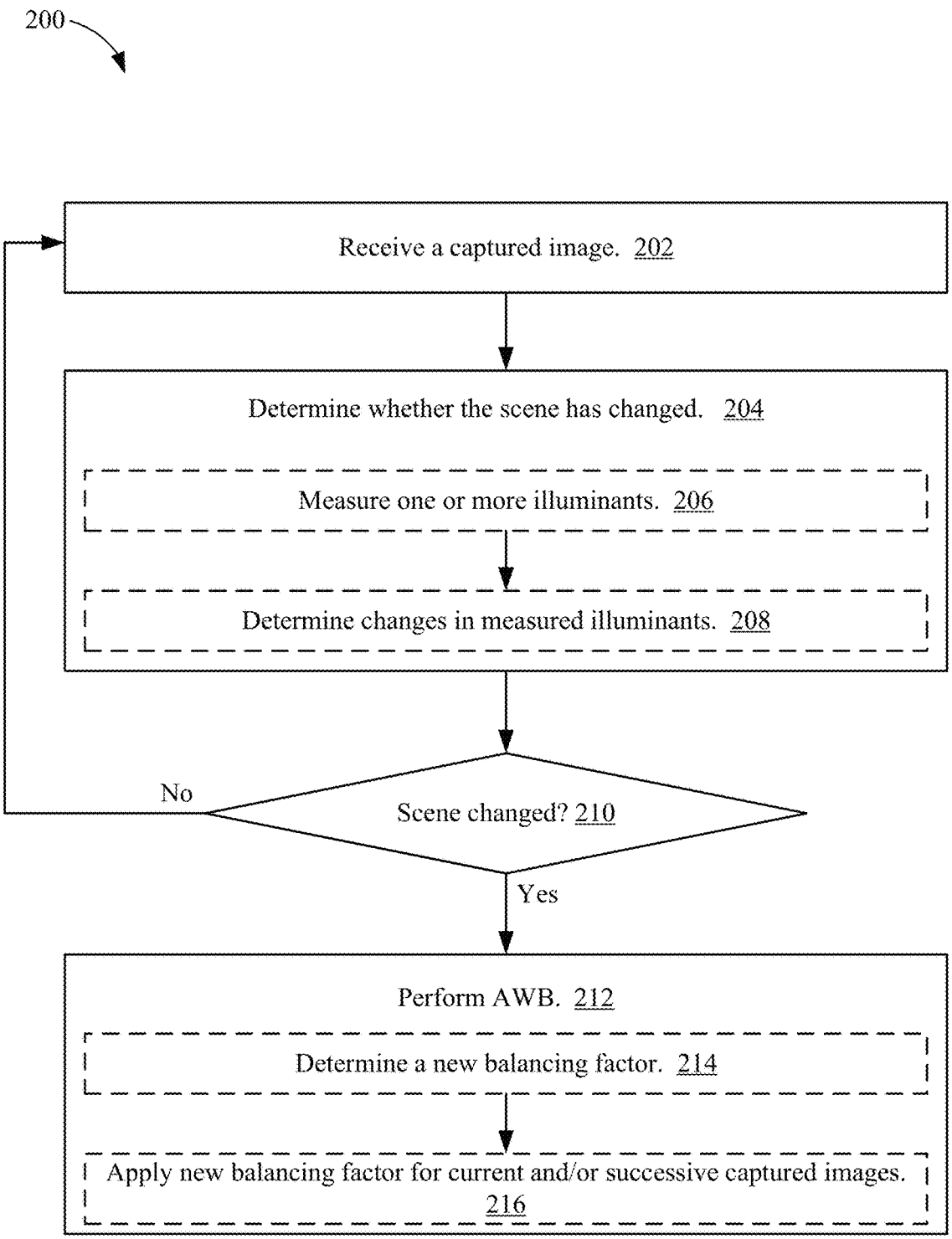
FIG. 2 is an illustrative flow chart depicting an example operation for performing AWB.

FIG. 2 is an illustrative flow chart depicting an example operation 200 for performing AWB. While the following examples are described regarding the device 100, other devices or systems may be used, and the present disclosure should not be limited to the following examples. Beginning at 202, the device 100 may receive a captured image. For example, the device 100 may use camera 102 to capture a raw image to be processed by the image signal processor 112. The device 100 (such as the image signal processor 112) then may use the captured image to determine whether the scene has changed for the camera 102 (204).

In some example implementations of determining whether a scene has changed (204), the device 100 may measure one or more illuminants of a captured image from the camera 102 (206). The device 100 then may determine any changes in the measured illuminants from a previous measurement (208). In some example implementations, the device 100 may compare measured illuminants across captured images to determine if the scene has changed so that AWB is to be performed. For example, a previous measurement may be considered a first illuminant value, and a scene may be determined to be changed enough to perform AWB if the current measurements deviate from the first illuminant value by a threshold (such as less than or greater than the first illuminant value by an illuminant threshold). In some examples, if the difference between the measured illuminant for the received image and the first illuminant value is less than the illuminant threshold, the device 100 determines that the scene has not changed between the received image and the previous image. If the difference between the measured illuminant for the received image and the first illuminant values is greater than the illuminant threshold, the device 100 determines that the scene has changed between the received image and the previous image. If the scene has not changed (210), the device 100 may receive another captured image to continue determining whether the scene has changed (with the process reverting to 202). If the scene has changed (210), the device 100 may perform AWB (212).

In some example implementations for performing AWB (212), the device 100 may determine new balancing factors based on the measured illuminants for the received image (214). For example, the device 100 may converge from the current balancing factors for AWB to new balancing factors based on the comparison of the measured illuminants. The rate of convergence from the existing balancing factors to the new balancing factors may be based on the comparison. For example, the device 100 may determine a rate of convergence for adjusting a first balancing factor based on the comparison of illuminants. In some example implementations, the rate of convergence may be a factor applied to the current balancing factor. For example, the new balancing factor may be within 5 percent of the previous balancing factor based on the comparison, and the rate of convergence may be a number between 95 percent and 105 percent to multiply the current balancing factor to obtain the new balancing factor.

In some example implementations, the device 100 may apply the new balancing factor to the current and/or successive captured images received by the device 100 to adjust the color temperature of the captured images (216). For example, the balancing factor may be used to correct a color cast of an image. In some example implementations, the new balancing factor may be for white balance operations for images captured after the received image. In some other example implementations, the new balancing factor may be for white balance operations for the received image.

While one balancing factor is described, multiple balancing factors may exist. In some example implementations, a balancing factor may be a factor to be applied for each color represented for the image. For example, a balancing factor may exist for each of the colors red, blue, and green if the image is represented in the RGB color space. In some other example implementations, the balancing factor may be a vector with values for the different colors in the color space. Other suitable balance factors may be used, and the present disclosure should not be limited to the provided examples.

In some aspects of the present disclosure, the device 100 may adjust the rate of converging from existing balancing factors to new balancing factors. The convergence rate may be based on determining that the scene changes (such as between images), and is further described below, such as regarding FIG. 5.

Figure 3:
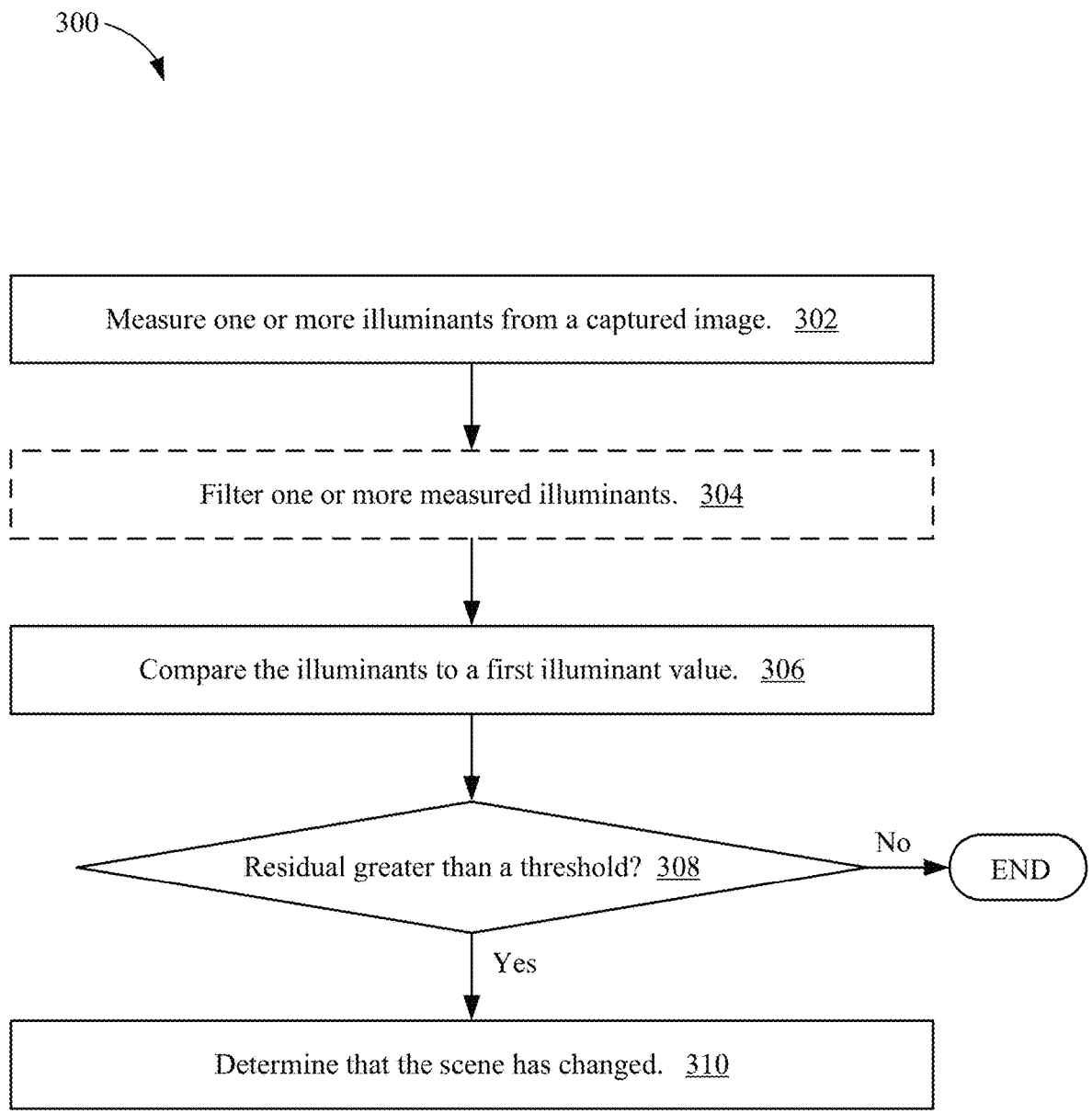
FIG. 3 is an illustrative flow chart depicting an example operation for detecting a scene change.

FIG. 3 is an illustrative flow chart depicting an example operation 300 for detecting a scene change. Operation 300 is an example implementation of steps 204 and 206 in FIG. 2. Beginning at 302, the device 100 may measure one or more illuminants from a captured image. When measuring one or more illuminants, an instance of an illuminant may be affected by noise or other ambient conditions. As a result, the measured illuminant may be an outlier from previously measured illuminants. In some example implementations, the device 100 may filter the measured illuminants to remove noise or artifacts caused by noise (304). Example filters include, but are not limited to, a finite impulse response (FIR) filter, an infinite impulse response (IIR) filter, a median filter, an averaging filter, or a combination of one or more filters.

In filtering the measured illuminants, the filters use previously measured illuminants. In one example, an IIR filter uses previously measured illuminants to determine a feedback to be applied in the filter. In another example, a median filter and an averaging filter use the current measured illuminant and an N number of previously measured illuminants to determine, respectively, a median measured illuminant or an average illuminant. The device 100 may persist an N number of previously measured illuminants (where N is a non-negative integer and may be configurable, illuminant type dependent, and/or filter dependent). For example, the device 100 may include a buffer to store N number of measurements. The buffer may be a first in first out (FIFO) buffer. For example, when a measurement is made by the device for a current image, the buffer stores the current measurement. If the buffer is full, the device 100 discards the oldest measurement in the buffer. The device 100 may reset the buffer when a new first illuminant value is determined for detecting a scene change, thus discarding any stored measurements.

In some example implementations, if the buffer is not full when determining a measured illuminant for the current captured image, the device 100 may determine not to filter the measured illuminant. For example, an IIR filter may require an N number of previous measurements before providing feedback. As a result, the IIR filter may not be activated until N number of measurements are performed or stored in the buffer. If more than one type of illuminant is measured by the device 100, the device 100 may filter any of the measured illuminants. Additionally, the same or different filters may be used for different types of illuminants, and a filter may be tuned for a specific type of illuminant.

The device 100 may compare the one or more illuminants to a first illuminant value (306). If the device 100 measures only one type of illuminant, the first illuminant value may include a reference value for the one type of illuminant. If the device 100 measures multiple types of illuminants, the first illuminant value may be a different reference value for each type of illuminant. In some example implementations, the reference value may be a previously measured illuminant (for a previous image). In some other example implementations, the first illuminant value for an illuminant is the previous measurement of the illuminant for when the device 100 converged to the current balancing factors. For example, the device 100 previously performed AWB (such as at initialization or a previous scene change). In this manner, balancing factors were determined, and the measured illuminant for the captured image when converging to the determined balancing factors is identified as the first illuminant value. In some example implementations, the device 100 identifies the measured illuminant as the first illuminant value only if the scene is no longer changing (is stable). For example, if the measured illuminants indicate that the scene is continuing to change (such as the camera is in the process of moving from indoors to outdoors), the first illuminant value may not be set until the measured illuminants indicate that the scene has stopped changing (such as the camera now being outdoors with no further lighting changes).

The difference between the one or more illuminants and the first illuminant value may be considered a "residual." A residual may include a set of values including a value for each of the types of illuminants measured by the device 100. The device 100 may determine whether the residual is greater than an overall threshold in determining whether the scene has changed (308). The device may determine if a residual is greater than the overall threshold in any suitable manner. In some aspects, if multiple types of illuminants are measured, an overall threshold may include different threshold values for each of the illuminant types. In this manner, the device may compare the residual value for a specific illuminant to a threshold value (of the overall threshold) for the specific illuminant. Determining whether a scene has changed between images based on a difference or magnitude of difference between illuminants may include any suitable determination and comparison of the residual, and the present disclosure should not be limited to a specific number or type of thresholds in determining whether the scene has changed.

In one example, the device 100 may determine that the residual is greater than an overall threshold if any of the residual values of the residual is greater than the corresponding threshold value of the overall threshold. In another example, the device 100 may determine that the residual is greater than the overall threshold only if all of the residual values are greater than the corresponding threshold values. In a further example, the device 100 may determine that the residual is greater than the overall threshold if a predetermined number of residual values are greater than the respective threshold values. In still a further example, the magnitude in difference between the threshold values and the residual values may be used in determining whether the residual is greater than the overall threshold. For example, a residual value greater than a corresponding threshold value by a smaller amount than another residual value may be considered to determine a scene change with less confidence than for the other residual value (since the difference from the threshold value is smaller for the residual value than for the other residual value). The confidence therefore may indicate if multiple types of residual values should be greater than the threshold values, the number of residual values to be greater than the threshold values, or other suitable means. The threshold values may be configurable, such as by a user, automatically updated by the device 100, and/or configured by a device manufacturer or provider. Further, the threshold may include any number of threshold values, and the residual may include any number of residual values, corresponding to the number of illuminants being measured (such as one or more values corresponding to one or more illuminants being measured).

If the residual is not greater than the threshold (308), the process ends with the device 100 determining that the scene has not changed. If the residual is greater than the threshold, the device 100 determines that the scene has changed (310). In some example implementations, detecting a scene change (such as example operation 300) may be performed by a scene change detector module of the device 100 (not shown). For example, the module may be implemented by the image signal processor 112. The module may be software executable by the image signal processor 112, hardware, or a combination of both. After determining that the scene is changed, the device 100 may determine to converge to new balancing factors for AWB.

In addition to detecting a scene change, the device 100 also may determine for how long the scene is detected to be changing (such as the number of image frames for which the scene is changing, an amount of time the scene is changing, and so on). In some example implementations, determining when the scene settles and for how long the scene is changing may be used by the device 100 to adjust converging to new balancing factors (such as adjusting the rate of convergence).

Figure 4:
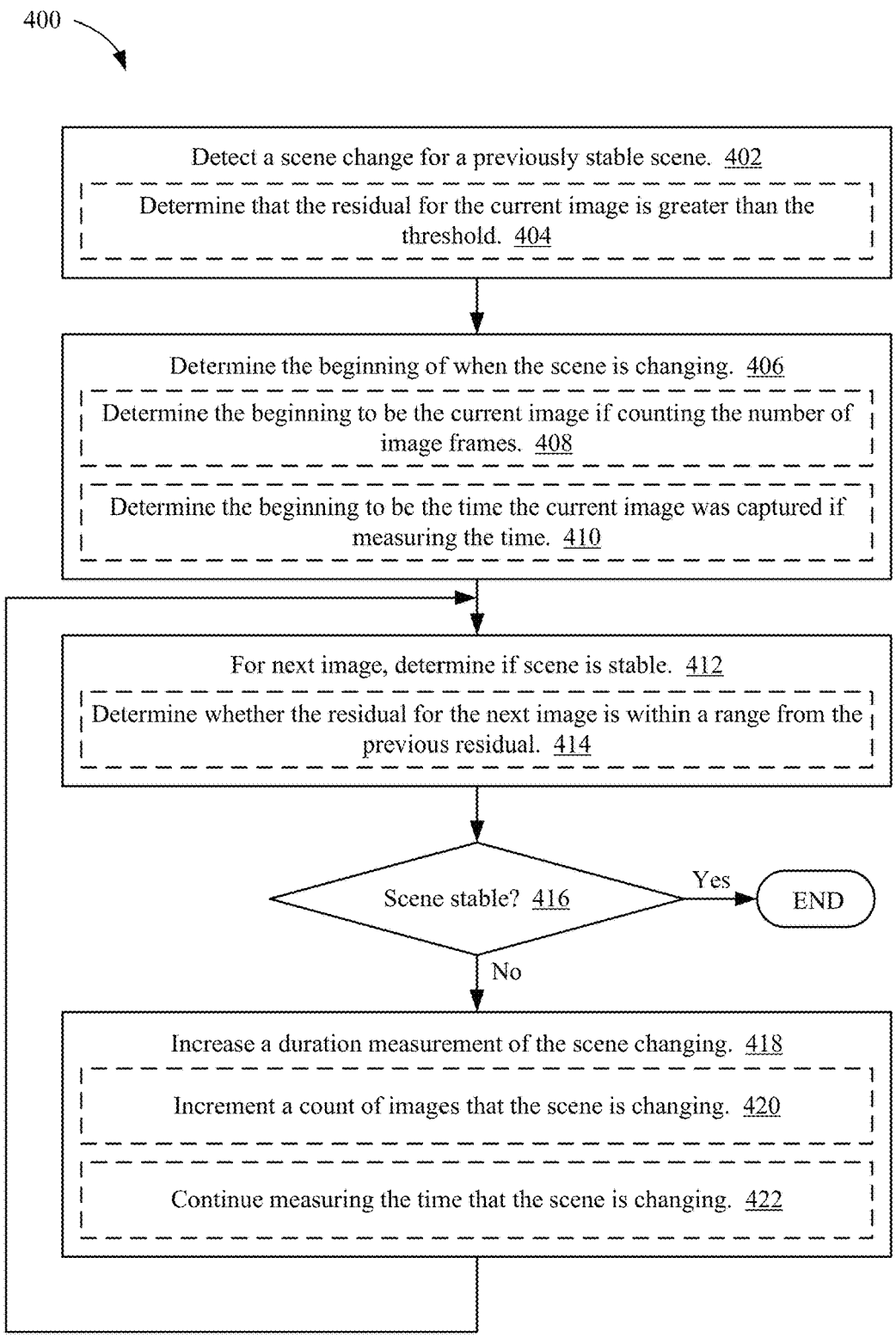
FIG. 4 is an illustrative flow chart depicting an example operation for determining how long a scene is changing and when the scene is stable.

FIG. 4 is an illustrative flow chart depicting an example operation 400 for determining how long a scene is changing and when the scene is stable. How long a scene is changing may be measured in, e.g., number of image frames captured, an elapsed amount of time, or another suitable reference. Beginning at 402, the device 100 may detect or determine that a previously stable scene has changed. In some example implementations, the device 100 determines that the residual determined for the current image is greater than the illuminant threshold for determining whether the scene is stable or changing (404).

As a result of detecting a scene change (402), the device 100 may determine the beginning of when the scene is changing (406). In some example implementations, if the device 100 counts the number of image frames in determining the duration of the scene changing, the device 100 may determine the beginning to be the current image for which a scene change is first detected (408). In some other example implementations, if the device 100 measures the amount of time in determining the duration of the scene changing, the device 100 may determine the beginning to be the time of capture for the current image for which a scene change is first detected (410). In some further example implementations, the device 100 may begin a timer for when a scene change is first detected in determining an amount of time the scene is changing (not shown).

The device 100 then may determine if the scene is stable for the next captured image (412). For example, the device 100 may determine whether the residual for the next image is within a range from the previous residual (414). If the scene is not stable (416), the device 100 may increase a duration measurement of the scene changing (418). In some example implementations, if the device 100 is counting the number of consecutive frames that the scene is changing, the device 100 may increment the count of images by one (420). In some other example implementations, if the device 100 is determining a time that the scene is changing, the device 100 may continue measuring the time that the scene is changing (422). In one example, the device 100 may continue a timer if a timer was started. In another example, the device 100 may consider the time when the image was captured as a time when the scene is still changing. If the scene is stable (416), the process ends and the device 100 may stop the duration measurement for the scene changing. In one example, a count of images may be stopped and indicate the number of image captures for the scene changing. In another example, a timer may be stopped and indicate the amount of time for the scene changing. In a further example, the device 100 may determine the time when the scene is first determined to not be changing. The device 100 may then compare the time when the scene is first determined to be changing to the time when the scene is first determined to not be changing to determine an amount of time for the scene changing. When the device 100 is to perform a new duration measurement for the scene changing for new image captures, the device 100, e.g., may reset the count of images for which the scene is changing, may reset a timer, or may discard the time determined to be the beginning of when the scene changed.

While step 414 illustrates determining a scene is stable based on one residual being within a range of the previous residual, in some other examples, a number of consecutive residuals may be compared to a range before determining that the scene is stable. For example, the device 100 may determine if an integer P number of consecutive residuals are within a pre-determined range of one another (where P may be configurable and/or pre-determined). If all (or greater than a pre-defined number) of the P consecutive residuals are not within the range, the device 100 determines that the scene is not stable (is still changing). In this manner, the device 100 may prevent an outlier residual from prematurely ending the measurement of when the scene is changing (thus determining that the scene is stable). Other suitable processes for determining a scene is stable may be used, and the present disclosure should not be limited to the provided examples.

The device 100 may prevent changing balancing factors or slow the convergence from current to new balancing factors while the scene changes. In some example implementations, the device 100 may be configured to prevent convergence or slow the convergence to different balancing factors for quick or temporary scene changes. For example, when the camera 102 passes a window, and the scene changes temporarily while passing the window, the device 100 may be configured to prevent determining new balancing factors or slow converging to new balancing factors. In some example implementations, the device 100 may compare the duration measurement (such as a number of frames or a length of time) to a duration threshold. For the scene changing for a duration less than the duration threshold, the device 100 may slow or stop the convergence to new balancing factors. In this manner, if a changing scene becomes stable before the threshold duration, the balancing factors may not be changed as much when the scene is determined to be changing as if conventional AWB is performed. In some aspects of slowing the convergence for balancing factors, the device 100 may decrease the rate of convergence used in converging the balancing factors.

Additionally or alternatively, if a changing scene becomes stable, the device 100 may speed up the convergence for balancing factors. For example, once the camera 102 has moved from indoors to outdoors, the scene may be determined stable such that the balancing factors to be determined will no longer be affected by a changing scene. As a result, the device 100 may increase or speed up the convergence to more quickly settle white balance operations for successive images. The duration threshold may be configurable and/or pre-determined. In some aspects of speeding up the convergence, the device 100 may increase the rate of convergence used in converging the balancing factors.

In converging from previous balancing factors to new balancing factors, the device 100 may use one or more previous images and the current image. For example, the device 100 may use the measured illuminants from one or more previous images and the measured illuminants from the current image in adjusting the previous balancing factors. The weight of the previous image(s)/illuminance measurements compared to the weight of the current image/illuminance measurements may be adjusted by the device 100 in increasing (speeding up) or decreasing (slowing down or stopping) the convergence to new balancing factors. If the previous image(s)/measurements are given more weight, the balancing factors are adjusted at a slower rate since the current image/measurements have less impact in determining the balancing factors. In this manner, the rate of convergence to new balancing factors may be decreased. If the previous image(s)/measurements are given less weight, the balancing factors are adjusted at a faster rate since the current image/measurements have more impact in determining the balancing factors. In this manner, the rate of convergence to new balancing factors may be increased.

The weights for previous images/measurements compared to a current image/measurement in converging to new balancing factors may be considered a "convergence factor." In some examples of rate of convergence, a convergence factor of 10% may indicate that the balancing factors are impacted 90% by the previous image(s)/measurements and 10% by the current image(s)/measurements. In this manner, the previous balancing factors may change no more than 10%, and the balancing factors converge to final values over a sequence of images. Other example convergence factors include 1%, 2%, 5%, 20% or any other suitable value.

In some example implementations, the typical convergence factor is 5% or 10%. Increasing the rate of convergence may include using a convergence factor greater than 5% or 10%, respectively. Decreasing the rate of convergence may include using a convergence factor less than 5% or 10%, respectively. Example convergences factors are 1% or 2% for slow convergence, 5% for typical convergence, and 10% for fast convergence. Other example convergence factors are 5% for slow convergence, 10% for typical convergence, and 20% for fast convergence. In some other examples, slow convergence may have a convergence factor of 0 if the balancing factors are not to be adjusted. The convergence factors may be adjustable or static. Additionally, the convergence factors may be set by a manufacturer or device distributor, set or adjusted by a user, automatically set or adjusted by the device 100 (such as based on scene type (indoors, sports shot, landscape, nighttime, and so on) or other factors), or any combination of the above. The present disclosure should not be limited to specific convergence factors are groups of convergence factors for different rates of convergence. The convergence factors to be used for converging to new balancing factors may be based on the rate of scene change and/or the duration of the scene changing. The rate of scene change may be the rate of change of residuals for successive image frames. The duration may be as described above regarding FIG. 4.

Figure 5:
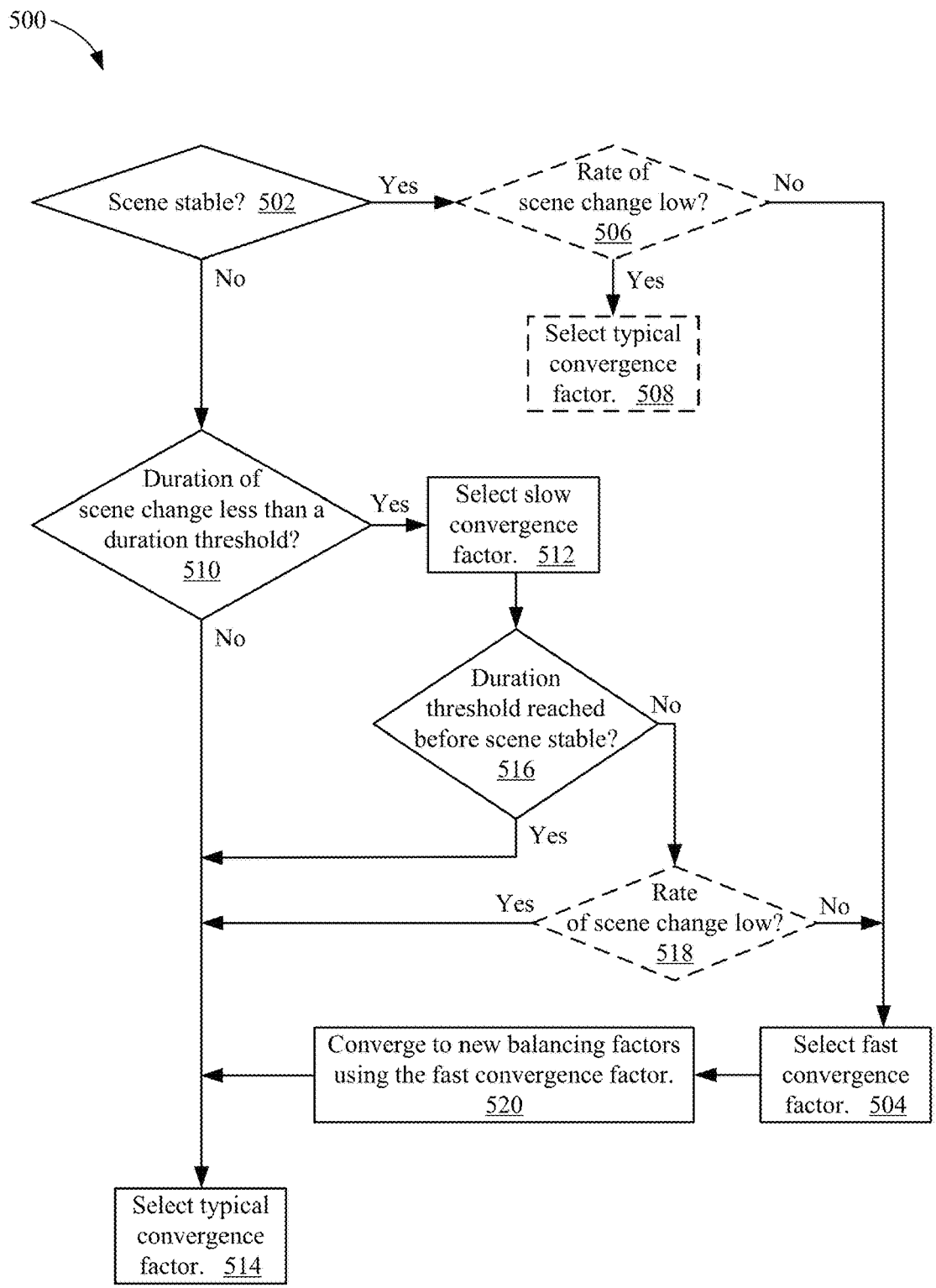
FIG. 5 is an illustrative flow chart depicting an example operation for selecting the convergence factor to be used in converging to new balancing factors.

FIG. 5 is an illustrative flow chart depicting an example operation 500 for selecting the convergence factor to be used in converging to new balancing factors. In some example implementations, the convergence factor may differ between: when the scene is still changing and when the scene becomes stable; when the duration of scene change is less than a duration threshold or greater than the duration threshold; and/or when the rate of scene change is low or not low (such as the rate being less than a rate threshold or the stable scene being similar to the scene before the scene change). While FIG. 5 is one example of selecting different convergence factors, other means of selection may be used. For example, while FIG. 5 illustrates three different convergence factors (slow, typical, and fast, such as 1%, 5%, and 10% respectively, or 5%, 10%, and 20% respectively), any number of convergence factors may be used for the selection. Further, any other suitable criteria for selecting a convergence factor may be used. The present disclosure should not be limited to the provided example.

For the example operation 500, the scene may be initially changing, and a convergence factor may have previously been selected. For example, when a scene initially is determined to be changing, a slow convergence factor may be selected since the duration of the scene change is less than the duration threshold and the scene change is occurring. Beginning at 502, the device 100 determines if the scene is stable. For example, the device 100 determines if a number of consecutive image residuals are within a pre-determined range. If the scene is stable, the device 100 may select a fast convergence factor (504).

In some other example implementations after determining that the scene is stable (502), the device 100 also may determine if the rate of the scene change (regarding the scene before a scene change and the scene after being stable or settling) is low (506). In one example, the device 100 may determine that the rate of scene change is low if the scene before the scene change is similar to the current scene that is stable. For example, the device 100 may determine if the measured illuminants for the stable scene are similar to the first illuminant value or the previously measured illuminants before the scene change. As described above, the first illuminant value may be one or more measured illuminants when the previous balancing factors were converged to by the device 100 performing AWB, the first illuminant value may be one or more previously measured illuminants for a previous image, or other suitable reference illuminant values for comparison. In another example, the device 100 may determine that the rate of scene change is low if the rate of scene change is below a threshold.

In optionally determining that the rate of scene change is low (506), the device 100 selects the typical convergence factor (508) instead of the fast convergence factor (504). If the rate of scene change is not low (506), the device 100 selects the fast convergence factor (504). For example, the device 100 may determine that the current stable scene is not similar enough to the scene before the scene change (residual is greater than a threshold) or that the rate of scene change is greater than a threshold in determining that the rate of scene change is not low. Conversely, the device 100 may determine the residual is less than a threshold or that the rate of scene change is less than a threshold in determining that the rate of scene change is low.

Referring back to 502, if the scene is stable, the device 100 may determine if the duration of scene change is less than a duration threshold (510). If the duration that the scene has been changing is less than the duration threshold (510), the device 100 may select a slow convergence factor (512). If the duration that the scene has been changing is greater than the duration threshold (510) (with the scene determined to be not yet stable in 502), the device 100 may select the typical convergence factor (514). In this manner, for the first amount of time (corresponding to the duration threshold) that the scene is changing (such as the camera 102 passing a window), the device 100 will slow convergence of the balancing factors related to the scene change. Thus, the device 100 may prevent large fluctuations in the balancing factors (and therefore fluctuations in the colors of processed images) when the scene change is temporary.

Referring back to 512, after the slow convergence factor is selected, the device 100 determines if the duration threshold is reached before the scene is stable (516). When the duration threshold is reached before the scene is stable (516), the device 100 may select the typical convergence factor (514). When the scene is stable before the duration threshold is reached (516), the device 100 may select the fast convergence factor (504).

In some example implementations after determining that the duration threshold is not reached (516), the device 100 optionally determines if the rate of scene change is low (518). Decision 518 may be similar to decision 506 described above. If the device 100 determines that the rate of scene change is low (518), the device 100 may select the typical convergence factor (514). If the device 100 determines that the rate of scene change is not low (518), the device 100 may select the fast convergence factor (504). After selecting the fast convergence factor (504), the device 100 may converge to the new balancing factors using the fast convergence factor (520). After converging to new balancing factors (520), the device 100 may select the typical convergence factor (514). In this manner, the typical convergence factor is the current convergence factor for when the scene again changes.

Referring back to 516, if the duration threshold is reached before the scene is stable, the device 100 may select the typical convergence factor (514) when the duration threshold is reached. When a convergence factor is selected (such as 504, 508, 512, or 514), the device 100 may begin or continue converging to new balancing factors using the selected convergence factor. For example, if the scene is initially changing and the device 100 selects a slow convergence factor, the device 100 may use the slow convergence factor to converge from a first balancing factor to a second balancing factor. If a new convergence factor is determined/selected for successive captured images, the device 100 then may converge from the second balancing factor to a third balancing factor using the newly determined/selected convergence factor. If the device 100 has not completed converging to a final balancing factor when selecting the typical convergence factor (514), the device 100 may complete convergence to the final balancing factor using the typical convergence factor. For example, the device 100 may determine that the scene is not changing between captured images and that the target balancing factor based on the measure illuminant for the last captured image differs from the current balancing factor. In this manner, the device 100 may continue to converge the current balancing factor using the convergence factor until the balancing factor reaches the determined target balancing factor for the last captured image.

Figure 6:
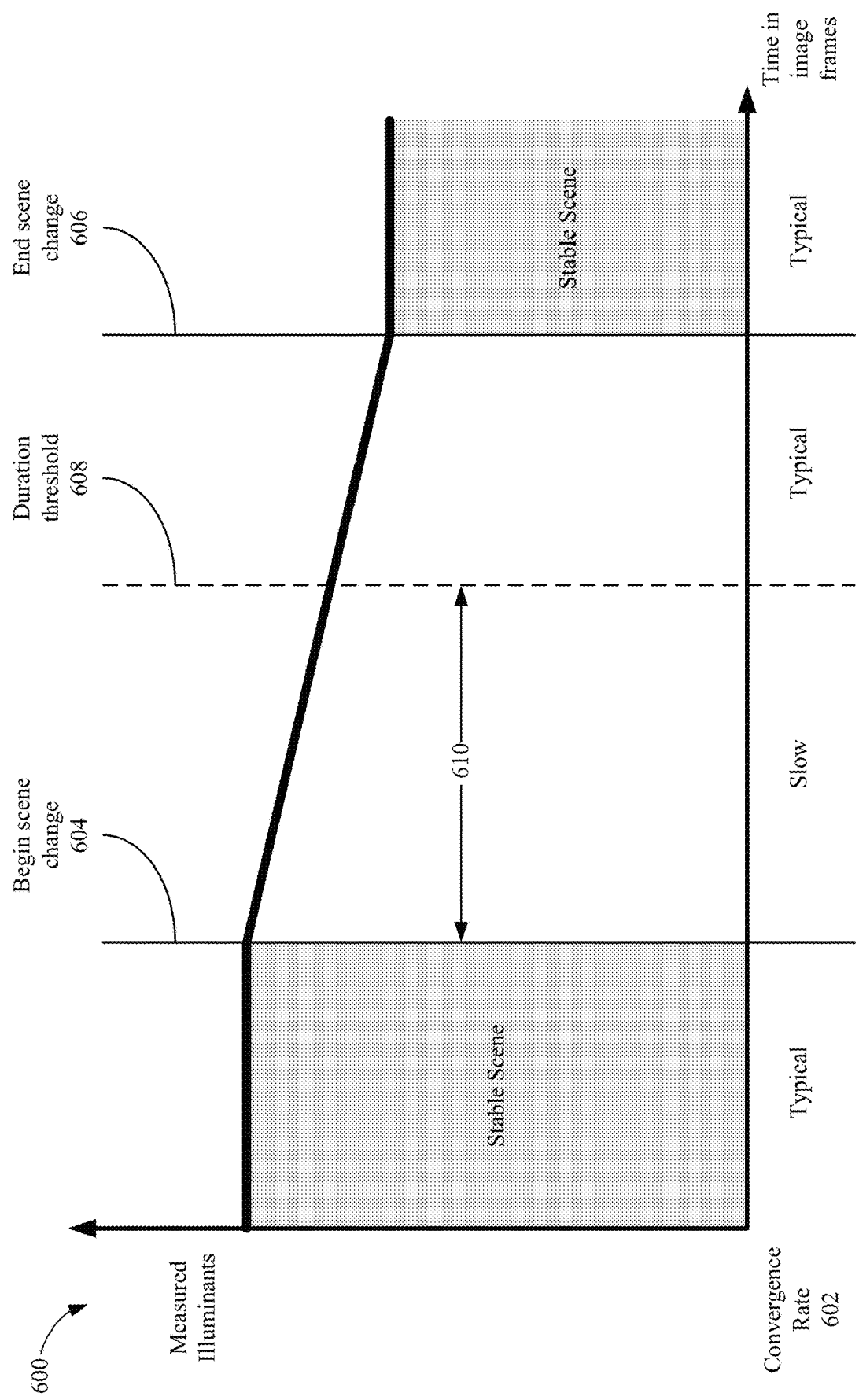
FIG. 6 depicts an example scene change with a low rate of scene change and the scene becoming stable after the duration threshold.

FIGS. 6-9 depict example scenarios of scene changes and when example slow, typical, or fast convergence of the balancing factor is performed using example operation 500 in FIG. 5. While the examples describe three convergence factors, any number of convergence factors or other suitable rates of convergence may be used, and the present disclosure should not be limited to the provided examples. FIG. 6 depicts an example scene change 600 with a low rate of scene change (as compared to FIG. 8 and FIG. 9) and the scene becoming stable after the duration threshold. As shown, the convergence rate 602 depends on whether the scene is stable (such as before 604 and after 606) and if the scene is changing for a duration longer than the duration threshold at 608. The location of the duration threshold at 608 is a time period 610 from 604, which may be configurable or static, and/or may be determined or adjusted by a user, a device manufacturer or provider, and/or the device 100.

Before the scene begins to change at 604, the typical convergence factor is selected, and a typical convergence rate occurs. However, if the device 100 has already converged to new balancing factors after the last scene change, the device 100 may not perform any convergence since the previously determined balancing factors are used for AWB. When the scene begins to change at 604 (such as the measured illuminants decreasing), and before the duration threshold at 608 is reached, a slow convergence rate may be used by the device 100 (such as the device 100 selecting a slow convergence factor). When the duration threshold 608 is reached and the scene is not yet stable, the convergence rate may be increased to a typical convergence rate (such as by selecting the typical convergence rate as the convergence rate for new images). The convergence rate also may be typical when the scene again becomes stable (at 606). As shown, the change in scene may cause a gradual change from the measured illuminants at 604 to the measured illuminants at 606. In another example, the rate of scene changes may be low if the measured illuminants at 606 are similar to the measured illuminants at 604 (such as within a predetermined range).

Figure 7:
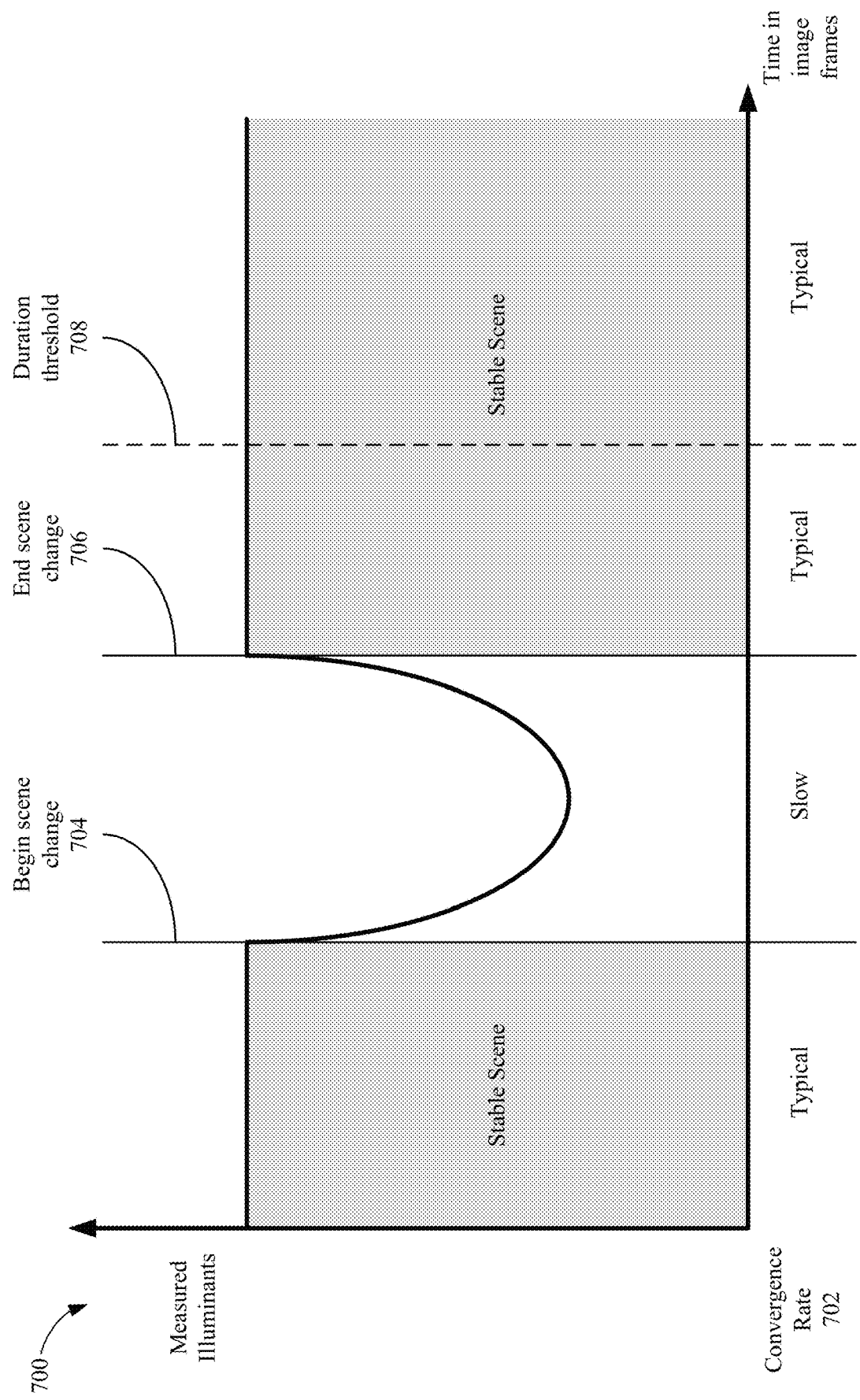
FIG. 7 depicts an example scene change with a low rate of scene change and the scene becoming stable before the duration threshold.

FIG. 7 depicts an example scene change 700 with a low overall rate of scene change (even though an instantaneous rate of scene change may be high) and the scene becoming stable before the duration threshold. While the measured illuminants may drastically change when the scene change begins at 704, the rate of scene change may be low if the measured illuminants before the scene change begins at 704 and after the scene change ends at 706 are similar. As shown, the convergence rate 702 depends on whether the scene is stable (such as before 704 and after 706), and the scene becomes stable before the duration threshold 708. The convergence rate 702 is a typical convergence rate before the scene begins to change (at 704) and after the scene again becomes stable (at 706) when the scene after becoming stable at 706 is similar to the scene before the scene change at 704. For example, the measured illuminants before and after the scene change are within a predefined distance or threshold of one another. During the scene change (between 704 and 706), the convergence rate 702 may be a slow convergence rate since the duration threshold at 708 is not yet reached.

Figure 8:
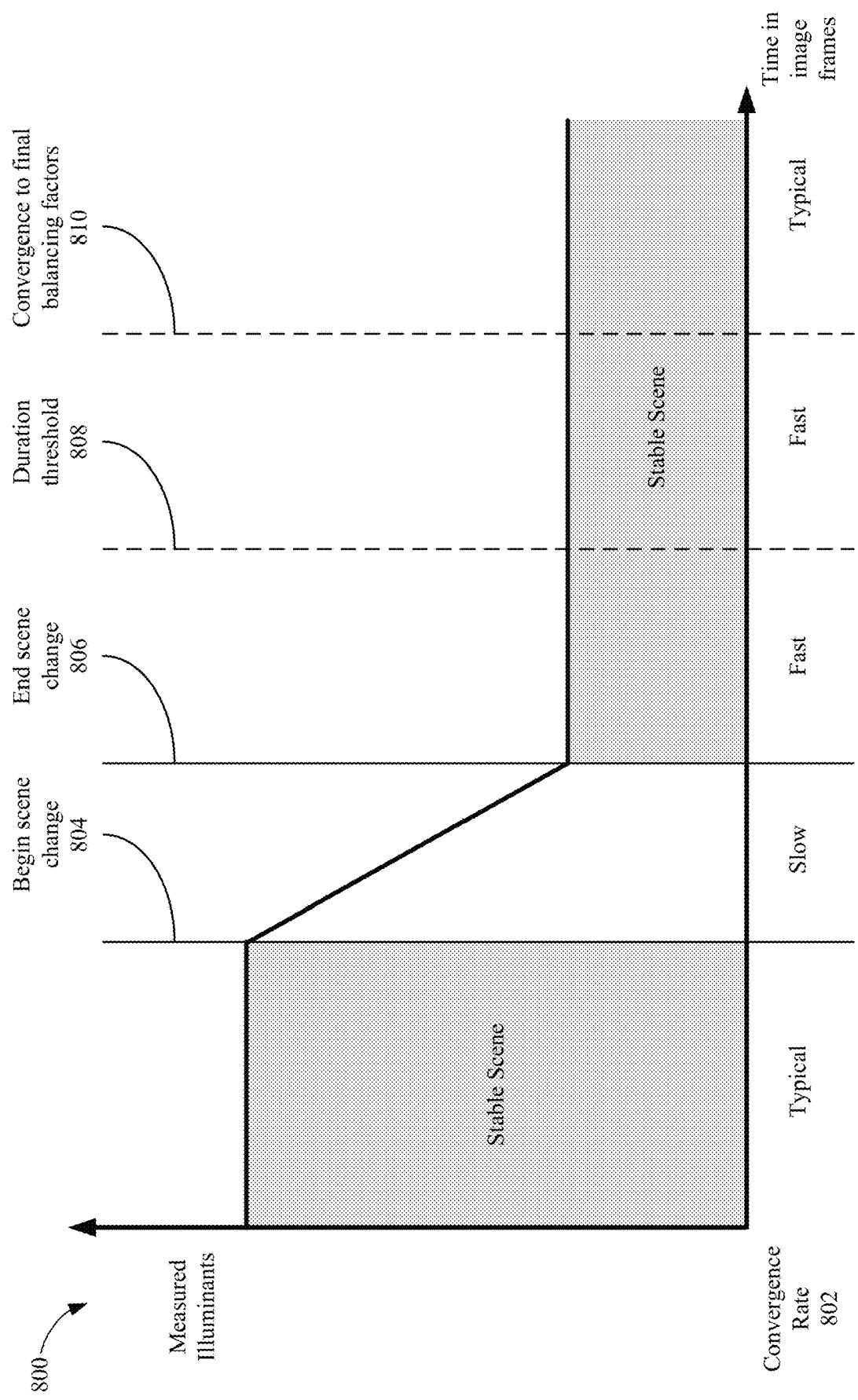
FIG. 8 depicts an example scene change with a high rate of scene change and the scene becoming stable before the duration threshold.

FIG. 8 depicts an example scene change 800 with a high rate of scene change and the scene becoming stable before the duration threshold. This example is the first example scene change in the present disclosure depicting the convergence rate 802 being a fast convergence rate. As shown, the convergence rate 802 depends on whether the scene is stable (such as before 804), when the scene becomes stable (at 806), and when the device 100 completes converging to final balancing factors using the high convergence rate (at 810). The convergence rate 802 is a typical convergence rate before the scene begins to change (at 804) and after the device completes converging to new balancing factors using the fast convergence rate (at 810). During the scene change (between 804 and 806), the convergence rate 802 may be a slow convergence rate since the scene is determined to be changing and the duration threshold at 808 is not yet reached. The convergence rate 802 may be a fast convergence rate from when the scene becomes stable (at 806) to when the device 100 completes converging to final balancing factors using the fast convergence rate (at 810).

Figure 9:
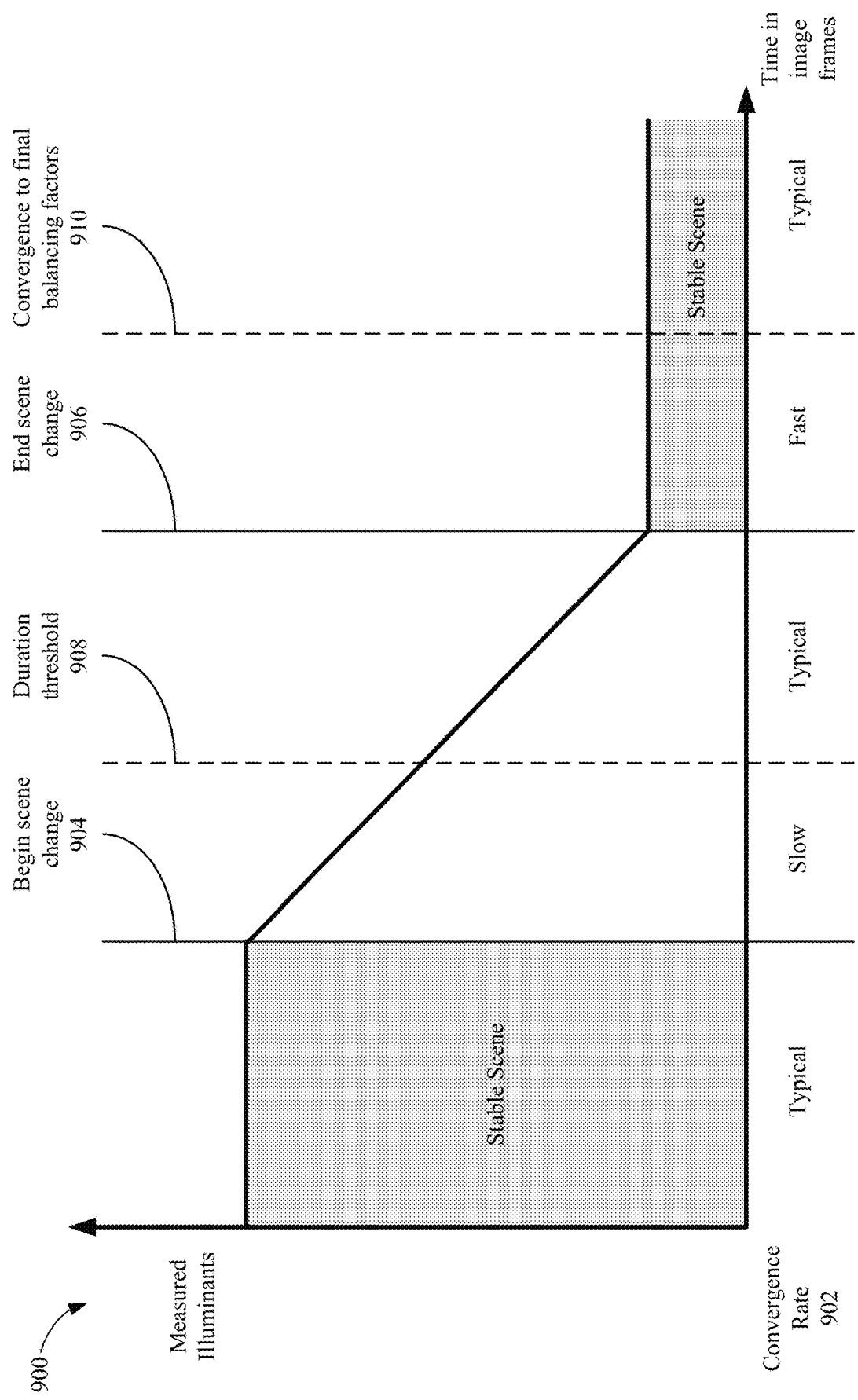
FIG. 9 depicts an example scene change with a high rate of scene change and the scene becoming stable after the duration threshold.

FIG. 9 depicts an example scene change 900 with a high rate of scene change and the scene becoming stable after the duration threshold. As shown, the convergence rate 902 depends on whether the scene is stable (such as before 904), when the scene becomes stable (at 906), when the duration threshold is reached (at 908), and when the device 100 completes converging to final balancing factors using the high convergence rate (at 910). The convergence rate 902 is a typical convergence rate before the scene begins to change (at 904) and after the device converges to final balancing factors using the fast convergence rate (at 910). During the scene change before reaching the duration threshold (between 904 and 908), the convergence rate 902 may be a slow convergence rate. When the duration threshold 908 is reached and until the scene becomes stable (at 906), the convergence rate 902 may be a typical convergence rate. The convergence rate 902 may be a fast convergence rate from when the scene becomes stable (at 906) to when the device 100 converges to final balancing factors using the fast convergence rate (at 910). The convergence rate 902 then may again be the typical convergence rate when the device 100 completes converging to the new balancing factors (at 910).

The examples in FIGS. 6-9 are for illustrative purposes and should not be used to limit the present disclosure. For example, the time domain (horizontal axis), measured illuminants (vertical axis), and/or the slope of the line or curve in FIGS. 6-9 may not be to scale and should not be used to limit the present disclosure.

The determined balancing factors may be used by the device 100 for one or more white balance operations for the current image or one or more successive images until new balancing factors are determined by the device 100. For example, the device 100 may use the balancing factors to correct or adjust a color cast of an image. In some other example implementations, the device 100 may update the balancing factors if the factors become stale or have been used for a pre-determined amount of time (to ensure that the factors are still correct or relevant). Additionally, the first illuminant value may be updated when the device 100 converges to new balancing factors (such as at 810 and at 910 in FIG. 8 and FIG. 9, respectively). For example, the device 100 may store the measured illuminants at 810 or at 910 as the new first illuminant value to be used in determining if a scene is beginning to change. Alternatively or additionally, the first illuminant value may be updated when the scene stops changing (such as at 606, at 706, at 806, and at 906 in FIGS. 6-9, respectively). For example, the device 100 may store the measured illuminants at 606, at 706, at 806, or at 906 as the new first illuminant value to be used in determining if a scene is beginning to change. In another example, the first illuminant value may be a measured illuminant for a previous image for comparison with the received captured image. In further example implementations, other suitable means for updating the first illuminant value may be used, and the present disclosure should not be limited to any specific example.

Figure 10:
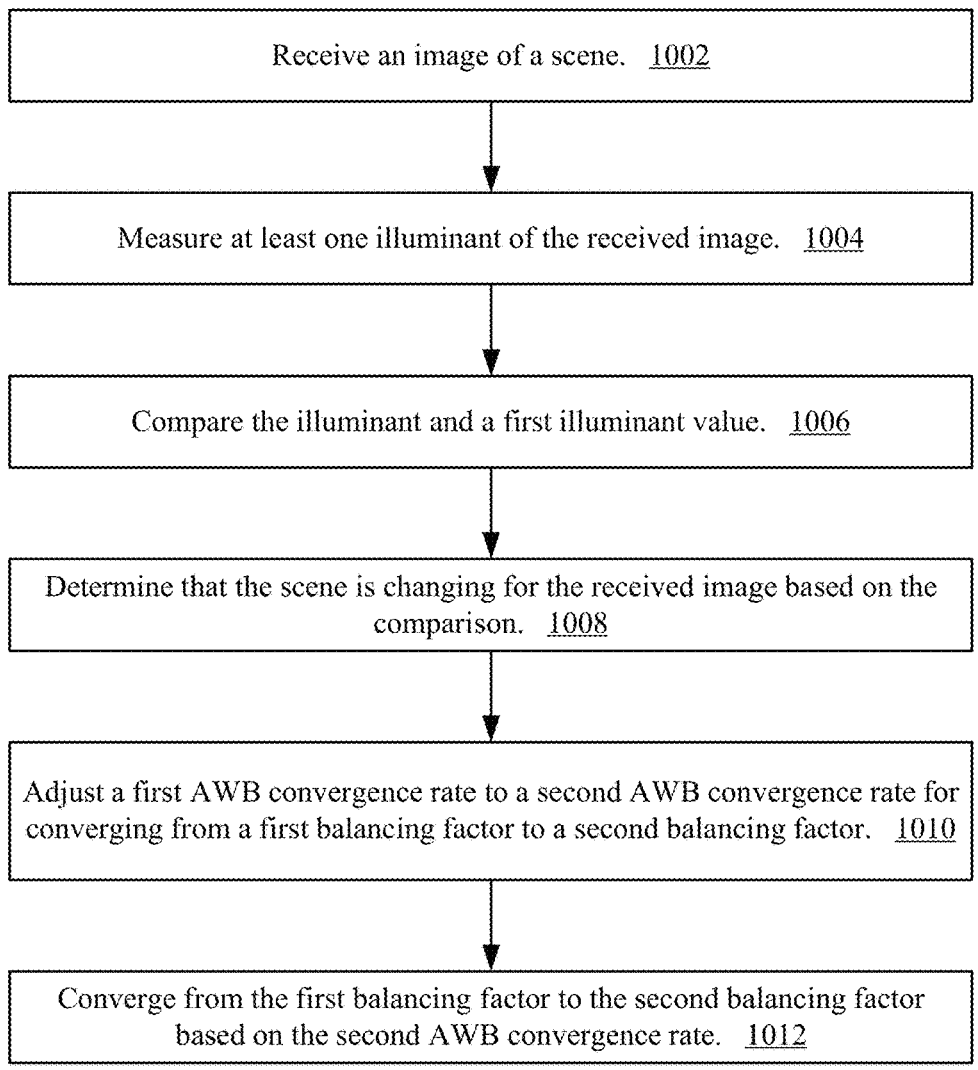
FIG. 10 is an illustrative flow chart depicting an example operation for performing a white balance operation.

FIG. 10 is an illustrative flow chart depicting an example operation 1000 for performing a white balance operation. Beginning at 1002, the device 100 may receive an image of the scene. For example, the device 100 may receive the image from the camera 102. In another example, the device 100 may receive an image captured by a camera separate from the device 100. The device 100 then may measure at least one illuminant of the received image (1004). For example, the device 100 may determine an overall luminance, a CCT, or other suitable illuminant for the received image.

Proceeding to step 1006, the device 100 may compare the at least one illuminant and a first illuminant value. The first illuminant value may be determined as described above or through any suitable means. For example, the first illuminant value may be a previously measured illuminant for a previous image (such as the image immediately preceding the current image). In some example implementations, step 1006 may be similar to step 306 in FIG. 3. For example, the device 100 may determine if the difference is greater than a threshold. In this manner, the device 100 may determine when the scene is changing for the received image based on the comparison (1008).

Previous images may be associated with a previous convergence rate for converging from one balancing factor to another balancing factor for white balance operations as a result of the scene change. For example, a previous convergence rate may be a typical convergence rate as described above. In other examples, the previous convergence rate may be any suitable convergence rate previously used by the device 100. In response to determining the scene is changing for the received image, the device 100 may adjust a first AWB convergence rate (currently set for the device 100) to a second AWB convergence rate for converging from a first balancing factor currently used by the device 100 to a second balancing factor (1010). For example, the device 100 may determine for a duration before a duration threshold when the scene begins changing to reduce the first AWB convergence rate to a lower second AWB convergence rate. For example, the device 100 may decrease the convergence factor.

The device 100 may converge from the first balancing factor to the second balancing factor based on the second AWB convergence rate (1012). For example, the device 100 may use the second AWB convergence rate to determine the second balancing factor between the first balancing factor and a final balancing factor to be determined when the scene is to become stable for new images. The device 100 then may perform one or more white balance operations based on the second balancing factor (not shown). In one example, the device 100 may use the balancing factor to estimate one or more final colors of a captured image (such as determining the neutral colors of a portion of an image or which portions of an image are to be a neutral color after processing). In another example, the device 100 may adjust a color cast of an image, such as the received image or successive received images. Alternatively, the device 100 may not perform white balance operations each time a new balancing factor is determined. For example, AWB may be performed an interval number of images, may be skipped for one or more images during a scene change, or may be performed at another suitable time or period.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 106 in the example device 100 of FIG. 1) comprising instructions 108 that, when executed by the processor 104 (or the camera controller 110 or the image signal processor 112), cause the device 100 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as the processor 104 or the image signal processor 112 in the example device 100 of FIG. 1. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

While the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. For example, the steps of the described example operations, if performed by the device 100, the camera controller 110, the processor 104, and/or the image signal processor 112, may be performed in any order and at any frequency. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

What is claimed is:

1. A method for performing automatic white balance (AWB), comprising:
   receiving a first image of a scene;
   measuring a first illuminant of the first received image;
   comparing the first illuminant and a first illuminant value;
   determining the scene is changing between the first received image and a previous image based on the comparison;

in response to determining the scene is changing, adjusting a first AWB convergence rate to a second AWB convergence rate;
converging, based on the second AWB convergence rate, from a first balancing factor to a second balancing factor for one or more white balance operations;
receiving a second image of the scene;
measuring a second illuminant of the second received image;
comparing the second illuminant and the first illuminant;
determining the scene is not changing between the second received image and the first received image based on the comparison of the second illuminant and the first illuminant; and
determining the second balancing factor is a target balancing factor for successively received images of the scene based on determining the scene is not changing between the second received image and the first received image.

2. The method of claim 1, wherein:
the first illuminant value is a previously measured illuminant for the previous image; and
determining the scene is changing between the first received image and the previous image includes determining that a first difference between the first illuminant and the previously measured illuminant is greater than an illuminant threshold.

3. The method of claim 2, further comprising performing a white balance operation based on the second balancing factor, wherein the white balance operation includes adjusting a color cast of a received image based on the second balancing factor.

4. The method of claim 2, further comprising:
determining that a scene change duration corresponding to the first received image is less than a duration threshold, wherein adjusting the first AWB convergence rate includes decreasing the first AWB convergence rate to the second AWB convergence rate based on the scene change duration being less than the duration threshold.

5. The method of claim 4, further comprising:
receiving a third image of the scene;
measuring a third illuminant of the third received image;
comparing the third illuminant and the first illuminant;
determining the scene is not changing between the third received image and the first received image based on the comparison of the third illuminant and the first illuminant;
determining that a second difference between the third illuminant and the previously measured illuminant is greater than a change threshold;
adjusting the second AWB convergence rate to a third AWB convergence rate greater than the first AWB convergence rate and greater than the second AWB convergence rate in response to determining:
the scene is not changing between the second received image and the first received image; and
the second difference is greater than the change threshold; and
converging, based on the third AWB convergence rate, from the second balancing factor to a third balancing factor for one or more white balance operations.

6. The method of claim 4, further comprising:
receiving a third image of the scene;
measuring a third illuminant of the third received image;
comparing the third illuminant and the first illuminant;
determining the scene is changing between the third received image and the first received image based on the comparison of the third illuminant and the first illuminant;
determining that the scene change duration corresponding to the third received image is greater than the duration threshold;
adjusting the second AWB convergence rate to a third AWB convergence rate equal to the first AWB convergence rate and greater than the second AWB convergence rate in response to determining:
the scene is changing between the third received image and the first received image; and
the scene change duration corresponding to the third received image is greater than the duration threshold; and
converging, based on the third AWB convergence rate, from the second balancing factor to a third balancing factor for one or more white balance operations.

7. The method of claim 4, further comprising:
receiving a third image of the scene;
measuring a third illuminant of the third received image;
comparing the third illuminant and the first illuminant;
determining the scene is not changing between the third received image and the first received image based on the comparison of the third illuminant and the first illuminant;
determining that a second difference between the third illuminant and the previously measured illuminant is less than a change threshold;
adjusting the second AWB convergence rate to a third AWB convergence rate greater than the first AWB convergence rate and greater than the second AWB convergence rate in response to determining:
the scene is not changing between the third received image and the first received image; and
the second difference is less than the change threshold; and
converging, based on the third AWB convergence rate, from the second balancing factor to a third balancing factor for one or more white balance operations.

8. A device configured to perform automatic white balance (AWB), comprising:
a memory; and
a processor coupled to the memory and configured to:
receive a first image of a scene;
measure a first illuminant of the first received image;
compare the first illuminant and a first illuminant value;
determine the scene is changing between the first received image and a previous image based on the comparison;
in response to determining the scene is changing, adjust a first AWB convergence rate to a second AWB convergence rate;
converge, based on the second AWB convergence rate, from a first balancing factor to a second balancing factor for one or more white balance operations;
receive a second image of the scene;
measure a second illuminant of the second received image;
compare the second illuminant and the first illuminant;
determine the scene is not changing between the second received image and the first received image based on the comparison of the second illuminant and the first illuminant; and
determine the second balancing factor is a target balancing factor for successively received images of the scene based on determining the scene is not changing between the second received image and the first received image.

9. The device of claim 8, wherein:
the first illuminant value is a previously measured illuminant for the previous image; and
the processor, in determining the scene is changing between the first received image and the previous image, is configured to determine that a first difference between the first illuminant and a previously measured illuminant is greater than an illuminant threshold.

10. The device of claim 9, wherein the processor is further configured to perform a white balance operation based on the second balancing factor, wherein the white balance operation includes adjusting a color cast of a received image based on the second balancing factor.

11. The device of claim 9, wherein the processor is further configured to:
determine that a scene change duration corresponding to the first received image is less than a duration threshold, wherein adjusting the first AWB convergence rate includes decreasing the first AWB convergence rate to the second AWB convergence rate based on the scene change duration being less than the duration threshold.

12. The device of claim 11, wherein the processor is further configured to:
receive a third image of the scene;
measure a third illuminant of the third received image;
compare the third illuminant and the first illuminant;
determine the scene is not changing between the third received image and the first received image based on the comparison of the third illuminant and the first illuminant;
determine that a second difference between the third illuminant and the previously measured illuminant is greater than a change threshold;
adjust the second AWB convergence rate to a third AWB convergence rate greater than the first AWB convergence rate and greater than the second AWB convergence rate in response to determining:
the scene is not changing between the third received image and the first received image; and
the second difference is greater than the change threshold; and
converge, based on the third AWB convergence rate, from the second balancing factor to a third balancing factor for one or more white balance operations.

13. The device of claim 11, wherein the processor is further configured to:
receive a third image of the scene;
measure a third illuminant of the second received image;
compare the third illuminant and the first illuminant;
determine the scene is changing between the third received image and the first received image based on the comparison of the third illuminant and the first illuminant;
determine that the scene change duration corresponding to the third received image is greater than the duration threshold;
adjust the second AWB convergence rate to a third AWB convergence rate equal to the first AWB convergence rate and greater than the second AWB convergence rate in response to determining:
the scene is changing between the third received image and the first received image; and
the scene change duration corresponding to the third received image is greater than the duration threshold; and
converge, based on the third AWB convergence rate, from the second balancing factor to a third balancing factor for one or more white balance operations.

14. The device of claim 11, wherein the processor is further configured to:
receive a third image of the scene;
measure a third illuminant of the third received image;
compare the third illuminant and the first illuminant;
determine the scene is not changing between the third received image and the first received image based on the comparison of the third illuminant and the first illuminant;
determine that a second difference between the third illuminant and the previously measured illuminant is less than a change threshold;
adjust the second AWB convergence rate to a third AWB convergence rate greater than the first AWB convergence rate and greater than the second AWB convergence rate in response to determining:
the scene is not changing between the third received image and the first received image; and
the second difference is less than the change threshold; and
converge, based on the third AWB convergence rate, from the second balancing factor to a third balancing factor for one or more white balance operations.

15. A non-transitory computer-readable medium storing one or more programs containing instructions that, when executed by a processor of a device, cause the device to:
receive a first image of a scene;
measure a first illuminant of the first received image;
compare the first illuminant and a first illuminant value;
determine the scene is changing between the first received image and a previous image based on the comparison;
in response to determining the scene is changing, adjust a first automatic white balance (AWB) convergence rate to a second AWB convergence rate;
converge, based on the second AWB convergence rate, from a first balancing factor to a second balancing factor for one or more white balance operations;
receive a second image of the scene;
measure a second illuminant of the second received image;
compare the second illuminant and the first illuminant;
determine the scene is not changing between the second received image and the first received image based on the comparison of the second illuminant and the first illuminant; and
determine the second balancing factor is a target balancing factor for successively received images of the scene based on determining the scene is not changing between the second received image and the first received image.

16. The computer-readable medium of claim 15, wherein:
the first illuminant value is a previously measured illuminant for the previous image; and
the instructions, for determining the scene is changing between the first received image and the previous image, cause the device to determine that a first difference between the first illuminant and a previously measured illuminant is greater than an illuminant threshold.

17. The computer-readable medium of claim 16, wherein the instructions further cause the device to perform a white balance operation based on the second balancing factor, wherein the white balance operation includes adjusting a color cast of a received image based on the second balancing factor.

18. The computer-readable medium of claim 16, wherein the instructions further cause the device to:
determine that a scene change duration corresponding to the first received image is less than a duration threshold, wherein adjusting the first AWB convergence rate includes decreasing the first AWB convergence rate to the second AWB convergence rate based on the scene change duration being less than the duration threshold.

19. The computer-readable medium of claim 18, wherein the instructions further cause the device to:
receive a third image of the scene;
measure a third illuminant of the third received image;
compare the third illuminant and the first illuminant;
determine the scene is not changing between the third received image and the first received image based on the comparison of the third illuminant and the first illuminant;
determine that a second difference between the third illuminant and the previously measured illuminant is greater than a change threshold;
adjust the second AWB convergence rate to a third AWB convergence rate greater than the first AWB convergence rate and greater than the second AWB convergence rate in response to determining:
the scene is not changing between the third received image and the first received image; and
the second difference is greater than the change threshold; and
converge, based on the third AWB convergence rate, from the second balancing factor to a third balancing factor for one or more white balance operations.

20. The computer-readable medium of claim 18, wherein the instructions further cause the device to:
receive a third image of the scene;
measure a third illuminant of the third received image;
compare the third illuminant and the first illuminant;
determine the scene is changing between the third received image and the first received image based on the comparison of the third illuminant and the first illuminant;
determine that the scene change duration corresponding to the third received image is greater than the duration threshold;
adjust the second AWB convergence rate to a third AWB convergence rate equal to the first AWB convergence rate and greater than the second AWB convergence rate in response to determining:
the scene is changing between the third received image and the first received image; and
the scene change duration corresponding to the third received image is greater than the duration threshold; and
converge, based on the third AWB convergence rate, from the second balancing factor to a third balancing factor for one or more white balance operations.

21. The computer-readable medium of claim 18, wherein the instructions further cause the device to:
receive a third image of the scene;
measure a third illuminant of the third received image;
compare the third illuminant and the first illuminant;
determine the scene is not changing between the third received image and the first received image based on the comparison of the third illuminant and the first illuminant;
determine that a second difference between the third illuminant and the previously measured illuminant is less than a change threshold;
adjust the second AWB convergence rate to a third AWB convergence rate greater than the first AWB convergence rate and greater than the second AWB convergence rate in response to determining:
the scene is not changing between the third received image and the first received image; and
the second difference is less than the change threshold; and
converge, based on the third AWB convergence rate, from the second balancing factor to a third balancing factor for one or more white balance operations.

22. A device configured to perform automatic white balance (AWB), comprising:
means for receiving a first image of a scene;
means for measuring a first illuminant of the first received image;
means for comparing the first illuminant and a first illuminant value;
means for determining the scene is changing between the first received image and a previous image based on the comparison;
means for adjusting, in response to determining the scene is changing, a first AWB convergence rate to a second AWB convergence rate;
means for converging, based on the second AWB convergence rate, from a first balancing factor to a second balancing factor for one or more white balance operations;
means for receiving a second image of the scene;
means for measuring a second illuminant of the second received image;
means for comparing the second illuminant and the first illuminant;
means for determining the scene is not changing between the second received image and the first received image based on the comparison of the second illuminant and the first illuminant; and
means for determining the second balancing factor is a target balancing factor for successively received images of the scene based on determining the scene is not changing between the second received image and the first received image.

23. The device of claim 22, wherein:
the first illuminant value is a previously measured illuminant for the previous image; and
the means for determining the scene is changing between the first received image and the previous image includes means for determining that a first difference between the first illuminant and the previously measured illuminant is greater than an illuminant threshold.

24. The device of claim 23, further comprising means for performing a white balance operation based on the second balancing factor, wherein the white balance operation includes adjusting a color cast of a received image based on the second balancing factor.

25. The device of claim 23, further comprising:
means for determining that a scene change duration corresponding to the first received image is less than a duration threshold, wherein adjusting the first AWB convergence rate includes decreasing the first AWB convergence rate to the second AWB convergence rate based on the scene change duration being less than the duration threshold.

26. The device of claim 25, further comprising:

means for receiving a third image of the scene;

means for measuring a third illuminant of the third received image;

means for comparing the third illuminant and the first illuminant;

means for determining the scene is not changing between the third received image and the first received image based on the comparison of the third illuminant and the first illuminant;

means for determining that a second difference between the third illuminant and the previously measured illuminant is greater than a change threshold;

means for adjusting the second AWB convergence rate to a third AWB convergence rate greater than the first AWB convergence rate and greater than the second AWB convergence rate in response to determining:

the scene is not changing between the third received image and the first received image; and the second difference is greater than the change threshold; and means for converging, based on the third AWB convergence rate, from the second balancing factor to a third balancing factor for one or more white balance operations.

27. The device of claim 25, further comprising:

means for receiving a third image of the scene;

means for measuring a third illuminant of the third received image;

means for comparing the third illuminant and the first illuminant;

means for determining the scene is changing between the third received image and the first received image based on the comparison of the third illuminant and the first illuminant;

means for determining that the scene change duration corresponding to the third received image is greater than the duration threshold;

means for adjusting the second AWB convergence rate to a third AWB convergence rate equal to the first AWB convergence rate and greater than the second AWB convergence rate in response to determining:

the scene is changing between the third received image and the first received image; and the scene change duration is greater than the duration threshold; and means for converging, based on the third AWB convergence rate, from the second balancing factor to a third balancing factor for one or more white balance operations.

28. The device of claim 25, further comprising:

means for receiving a third image of the scene;

means for measuring a third illuminant of the third received image;

means for comparing the third illuminant and the first illuminant;

means for determining the scene is not changing between the third received image and the first received image based on the comparison of the third illuminant and the first illuminant;

means for determining that a second difference between the third illuminant and the previously measured illuminant is less than a change threshold;

means for adjusting the second AWB convergence rate to a third AWB convergence rate greater than the first AWB convergence rate and greater than the second AWB convergence rate in response to determining:

the scene is not changing between the third received image and the first received image; and the second difference is less than the change threshold; and means for converging, based on the third AWB convergence rate, from the second balancing factor to a third balancing factor for one or more white balance operations.

* * * * *